(12) United States Patent
Northway

(10) Patent No.: US 6,888,534 B1
(45) Date of Patent: May 3, 2005

(54) SEGMENTED KEYBOARD FOR PORTABLE COMPUTER SYSTEM

(75) Inventor: David Northway, San Carlos, CA (US)

(73) Assignee: palmOne, Inc., Milpitas, CA (US)

(*) Notice: Subject to any disclaimer, the term of this patent is extended or adjusted under 35 U.S.C. 154(b) by 212 days.

(21) Appl. No.: 09/774,913

(22) Filed: Jan. 30, 2001

(51) Int. Cl.$^7$ .................................................. G09G 5/00
(52) U.S. Cl. ........................ 345/169; 345/168; 361/680; D14/331
(58) Field of Search ................................ 345/156, 168, 345/169, 173; 341/22; 361/680, 681, 683; D14/331, 333; 463/37; 16/337, 368; 445/550, 556

(56) References Cited

U.S. PATENT DOCUMENTS

| | | | | |
|---|---|---|---|---|
| 5,278,779 A | * | 1/1994 | Conway et al. ............ 361/680 |
| 5,410,447 A | * | 4/1995 | Miyagawa et al. ......... 361/681 |
| 5,543,790 A | * | 8/1996 | Goldstein ................... 341/22 |
| 5,666,694 A | * | 9/1997 | Slow et al. ................. 16/368 |
| 5,712,760 A | * | 1/1998 | Coulon et al. ............. 361/680 |
| 5,898,600 A | * | 4/1999 | Isashi ........................ 708/105 |
| 5,949,643 A | * | 9/1999 | Batio ......................... 361/681 |
| 5,995,025 A | * | 11/1999 | Sternglass et al. .......... 341/22 |
| 6,040,977 A | * | 3/2000 | Hoffer ........................ 361/680 |
| 6,101,676 A | * | 8/2000 | Wahl et al. .................. 16/342 |
| 6,108,200 A | * | 8/2000 | Fullerton .................... 361/686 |
| 6,154,359 A | * | 11/2000 | Kamikakai et al. ........ 361/681 |
| 6,175,504 B1 | * | 1/2001 | Hood et al. ................. 361/749 |
| 6,215,419 B1 | * | 4/2001 | Leman ........................ 341/22 |
| 6,256,017 B1 | * | 7/2001 | Bullister .................... 345/168 |
| D448,032 S | * | 9/2001 | Talley ....................... D14/396 |
| 6,370,018 B1 | * | 4/2002 | Miller et al. ............... 361/680 |
| 6,392,870 B1 | * | 5/2002 | Miller, Jr. .................. 361/680 |
| 6,480,377 B2 | * | 11/2002 | Genest et al. .............. 361/686 |
| 2002/0063690 A1 | * | 5/2002 | Chung et al. ............... 345/168 |
| 2002/0084920 A1 | * | 7/2002 | Olodort et al. .............. 341/22 |
| 2002/0191999 A1 | * | 12/2002 | Katz ........................... 400/472 |

FOREIGN PATENT DOCUMENTS

JP          11296258 A    * 10/1999

* cited by examiner

Primary Examiner—Ricardo Osorio
(74) Attorney, Agent, or Firm—Wagner, Murabito, & Hao LLP

(57) ABSTRACT

The present invention provides an apparatus enabling users to input/manipulate data for portable computer systems. In one embodiment, the present invention is comprised of a segmented keyboard adapted to be coupled with a portable computer system. In the present embodiment, the segmented keyboard is comprised of a first flippable portion and second flippable portion, both of which are hinged to the fixed portion of the segmented keyboard. A compliment of input keys are disposed within those portions. In the present embodiment, a first rotatable hinge is coupled with the segmented keyboard. A second rotatable hinge is coupled with the first rotatable hinge. In the present embodiment, an electrical connector is coupled with the second rotatable hinge. The electrical connector is adapted to provide a communicative link between the segmented keyboard and a coupled portable computer system. The present invention, when in a closed position, is of a size and shape approximate to a portable computer system.

20 Claims, 21 Drawing Sheets

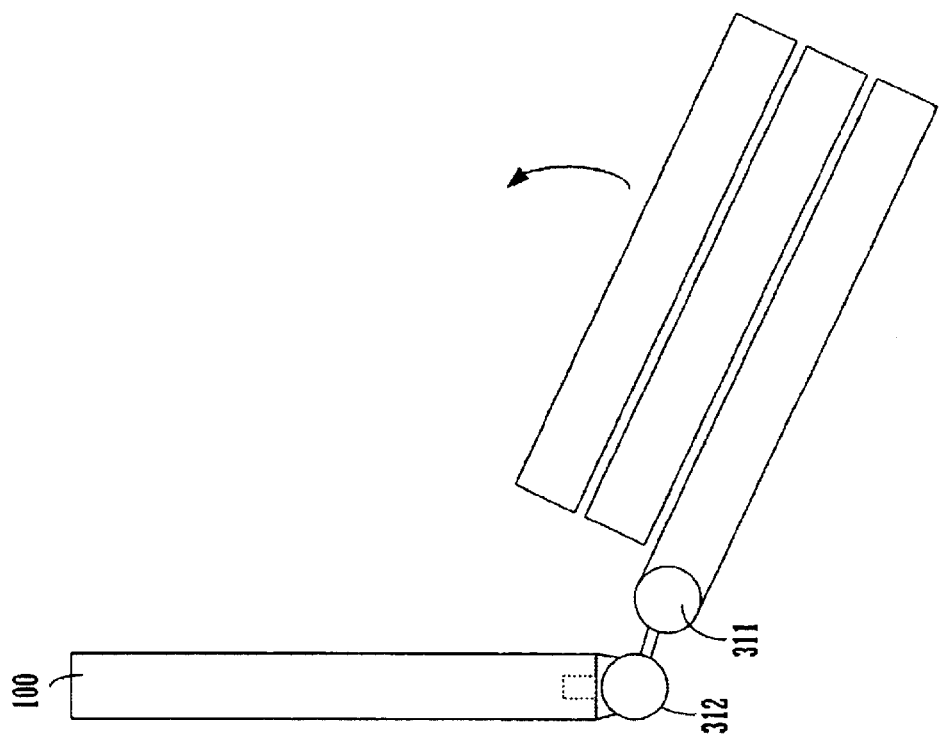

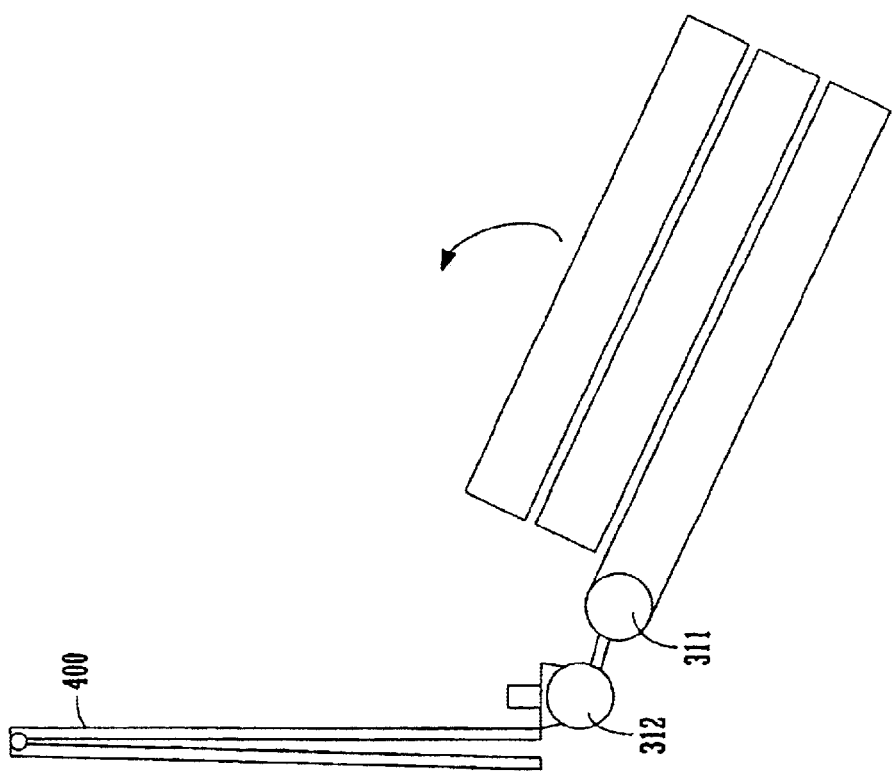

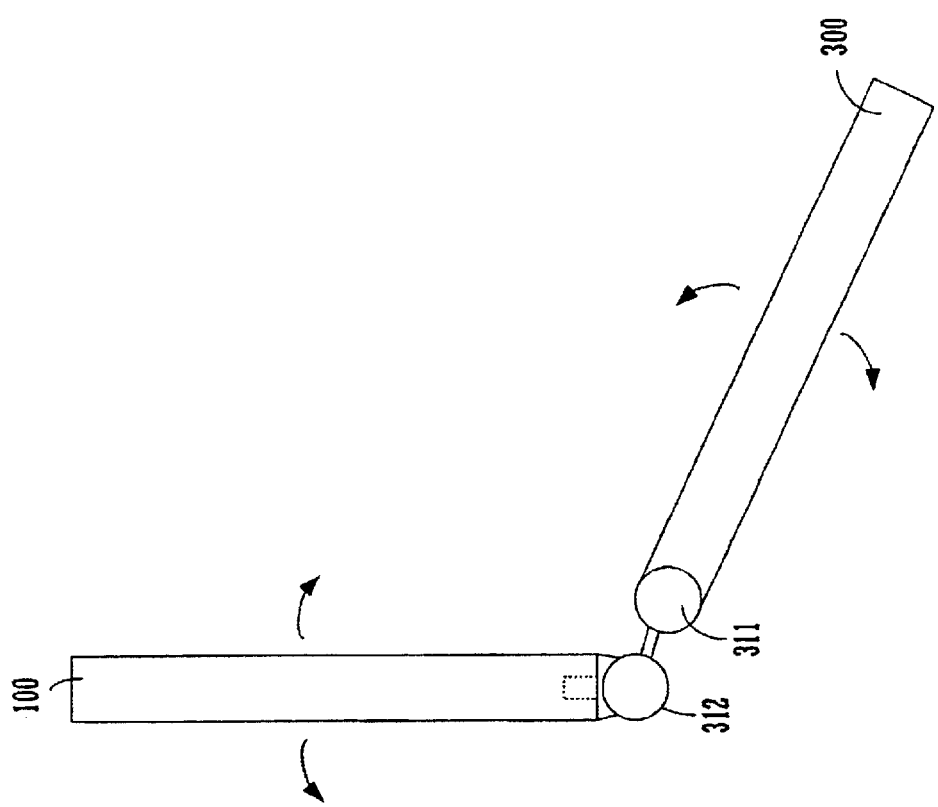

SEGMENTED KEYBOARD FOR PORTABLE COMPUTER SYSTEM

FIELD OF THE INVENTION

The present invention relates to portable computer systems such as a palmtop computers or PDAs. More particularly, the present invention provides an apparatus for the inputting or manipulation of data for portable computer systems.

BACKGROUND OF THE INVENTION

Continued advancement in technology has enabled further miniaturization of the components required to build computer systems. As such, new categories of computer systems have been created. One of the newer categories of computer systems developed has been the portable, hand held, or "palmtop" computer system, referred to as a personal digital assistant or PDA. Other examples of a palmtop computer system include electronic address books, electronic day planners, electronic schedulers and the like. Many corporations have developed and are currently marketing their individual PDAs.

A palmtop computer system is a computer that is small enough to be held in the users hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

While the continuing miniaturization of computer systems has enabled a user to now carry in their pocket the equivalent of a computer system that once occupied an entire room, the miniaturization has also mandated a reduction in certain functions of the palmtop computer system. To support the diminutive form factor of the palmtop computer, certain functions and components normally associated with full sized computers have been reduced or eliminated.

Inherent to the size of the portable computer system, the display screen is substantially reduced. To replace the CRT (cathode ray tube) type display usually associated with a desktop computer system, a flat panel display has been developed. In one example, the display screen is a LCD (liquid crystal display). It is known that LCDs have an optimum viewing angle, as do most other display types. As such, a user may have to adjust how the portable computer system is held or supported to optimize the viewing angle to reduce glare and to improve viewing.

Another component whose functionality has been greatly reduced is the keyboard. The approximate dimensions of an average portable computer system such as a palmtop or PDA is about 4¾ inches long by 3¼ inches wide by ⅝ inches thick. The approximate dimensions of a normal keyboard is 7 (seven) inches tall by 19 inches wide by 1½ inches thick. As one could imagine, having to carry a full sized keyboard for inputting data into a portable computer system would defeat the purpose of the diminutive design of the portable computer system.

To overcome the loss of the keyboard for data entry, alternative methods for the inputting of data have been developed. In one example, the portable computer system 2 as shown in FIG. 1 Prior Art is configured with a software program that displays to the user, via display panel 5, a small graphic representing either a down-sized "qwerty" type keyboard without numbers or a small graphic that displays a numeric keyboard. Due to the limited display area, either the numeric input pad or the alphabetic input pad may be displayed, but neither at the same time. As such, if a user needs to input both numbers and letters, they must switch back and forth between the two graphic input pads. Additionally, to input a number or letter into the portable computer system, the user must singularly select each letter or number with a stylus 3 adapted to be utilized with the touch screen capabilities of the portable computer system. By requiring the user to touch each character as displayed, the task of inputting data is a slow and rather laborious process that is not conducive to the inputting of large amounts of data.

Still referring to FIG. 1 Prior Art, in another attempt to provide for data input, display panel 5 is configured with a handwriting recognition pad areas 6a and 6b. This recognition pad enables a user to input letters or numbers by "writing" them on the touch screen. Pad area 6a is adapted for alphabetic input and pad area 6b is adapted for numeric input. Each number or letter has a prescribed writing motion that must be utilized by the user to be recognized by the portable computer system. To input data, the user must singularly "write" each number or letter. By requiring the user to individually write each letter with the prescribed writing motion, this method of inputting data is also a slow and laborious process that is not conducive to the inputting of large amounts of data.

SUMMARY OF THE INVENTION

Thus a need exists for an apparatus for providing user input or manipulation of data for portable computer systems. Another need exists for an apparatus which fills the above need and which provides for inputting in a fast and efficient manner. Additionally, a need exists for an apparatus that fills the above needs and that is complimentary to the diminutive size of the portable computer system while providing full sized keyboard functionality to the user. A further need exists for an apparatus that fills the above need and which allows the user to orient the portable computer system such that the display panel is at the user's optimum viewing angle.

These and other objects and advantages of the present invention will no doubt become obvious to those of ordinary skill in the art after having read the following detailed description of the preferred embodiments which are illustrated in the various drawing figures.

Accordingly, the present invention provides an apparatus for providing user input or manipulation of data for portable computer systems. The present invention further provides an apparatus which achieves the above listed accomplishment and which further provides for quick and efficient inputting of data. The present invention also provides an apparatus that achieves the above listed accomplishments and which further provides full sized keyboard functionality while remaining complimentary to the diminutive size of the portable computer system. Additionally, the present invention provides an apparatus that achieves the above listed accomplishments and which further provides to a user the ability to orient the portable computer system such that the display panel is at the optimum viewing angle for their particular physical characteristics.

More specifically, the present invention provides an apparatus for a user to input or manipulate data for portable computer systems. In one embodiment, the present invention is comprised of a segmented keyboard. The segmented keyboard is adapted to be communicatively coupled to a portable computer system. In the present embodiment, the segmented keyboard is comprised of a first flippable portion and second flippable portion, both of which are hinged to the fixed portion of the segmented keyboard. A full compliment of input keys are disposed within those portions. In the present embodiment, a first rotatable hinge is coupled with the segmented keyboard. A second rotatable hinge is coupled with the first rotatable hinge. In the present embodiment, an electrical connector is coupled with the second rotatable hinge. The electrical connector is adapted to provide a communicative link between the segmented keyboard and a portable computer system with which it will interact.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9A is a side view perspective of the embodiment of the present invention of FIG. 8A shown as further rotated in preparation for use, in accordance with one embodiment of the present invention.

FIG. 9B is a side view perspective of the embodiment of the present invention of FIG. 8B shown as further rotated in preparation for use, in accordance with one embodiment of the present invention.

FIG. 10A is a side view perspective of the embodiment of the present invention of FIG. 9A shown in the operative position, in accordance with one embodiment of the present invention.

DETAILED DESCRIPTION

Figure 1:
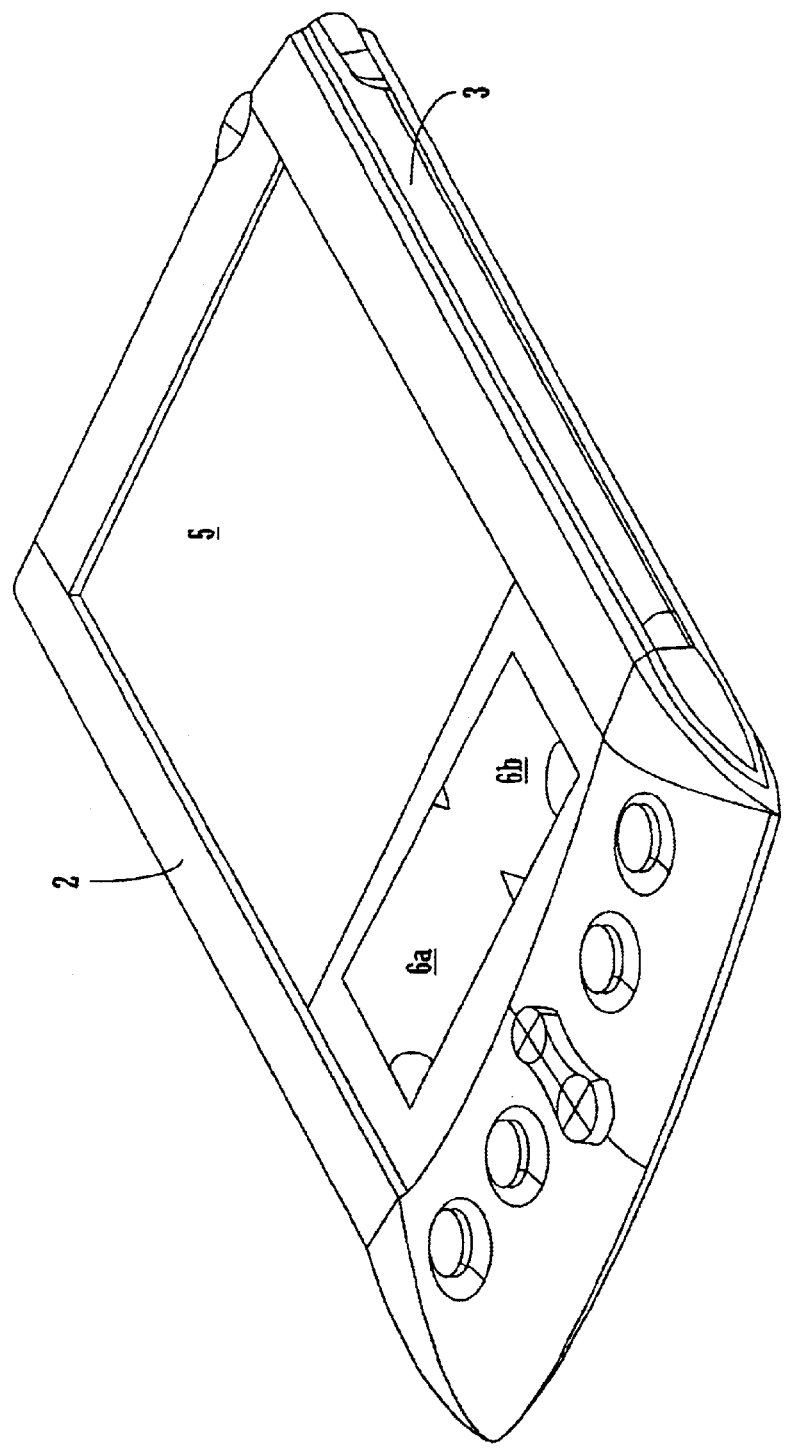
FIG. 1 PRIOR ART is an front-view illustration of a palmtop computer, in accordance with one embodiment of the present invention.

An apparatus for enabling a user to input or manipulate data for portable computer systems is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or "touching" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant. However, it is appreciated that the present invention can be used with other types of devices that have the capability to receive and store data and that are able to access some type of central device or central site, including but not limited to palmtop computer systems.

Exemplary Portable Computer Platform

Figure 2A:
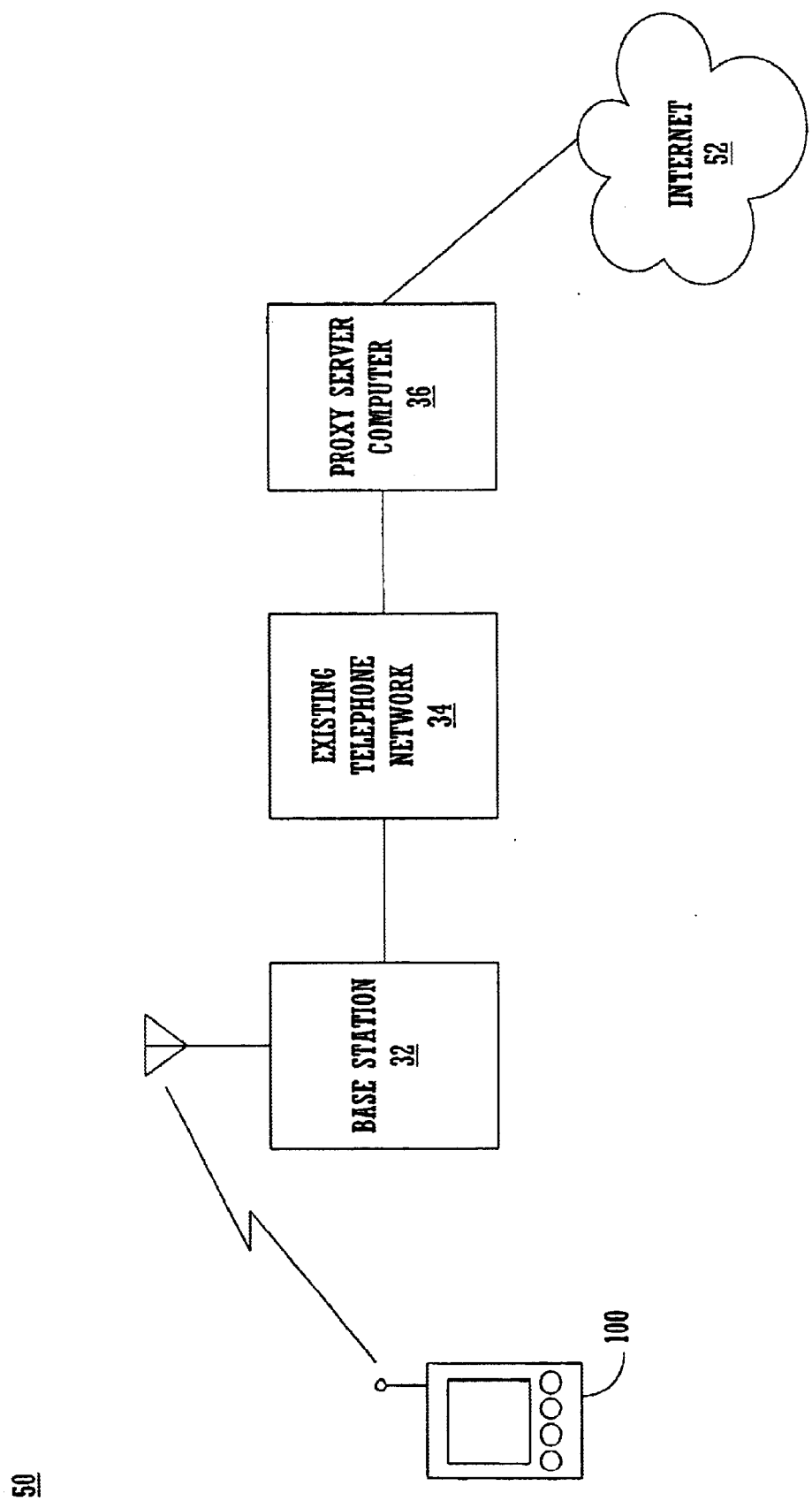
FIG. 2A is a block diagram of an exemplary network environment including a portable computer system, in accordance with one embodiment of the present invention.

FIG. 2A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer systems" is not intended to be limited solely to conventional palmtop or portable computers. Instead, the term "portable computer" or "portable computer system" is also intended to include any mobile device which can be used to wirelessly communicate with a network. Such mobile devices include but are not limited to pagers and paging systems, wireless and cellular telephones, electronic address books, and numerous other mobile devices which have the ability to wirelessly communicate with a network. As such, for purposes of the present application, the terms "portable computer" and "mobile device" will be considered synonymous and will be used interchangeably throughout the present application.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 2A, the existing telephone network could also be a packet-based network utilized by some conventional portable computer systems. However, a wireless communication interface is utilized to communicate data and information between portable computer system 100 and base station 32. It should be appreciated that one embodiment of a wireless communication system in accordance with the present invention is the Mobitex wireless communication system. Furthermore, any wireless network, in addition to the Mobitex wireless network, can support the functionality to be disclosed herein.

Figure 2B:
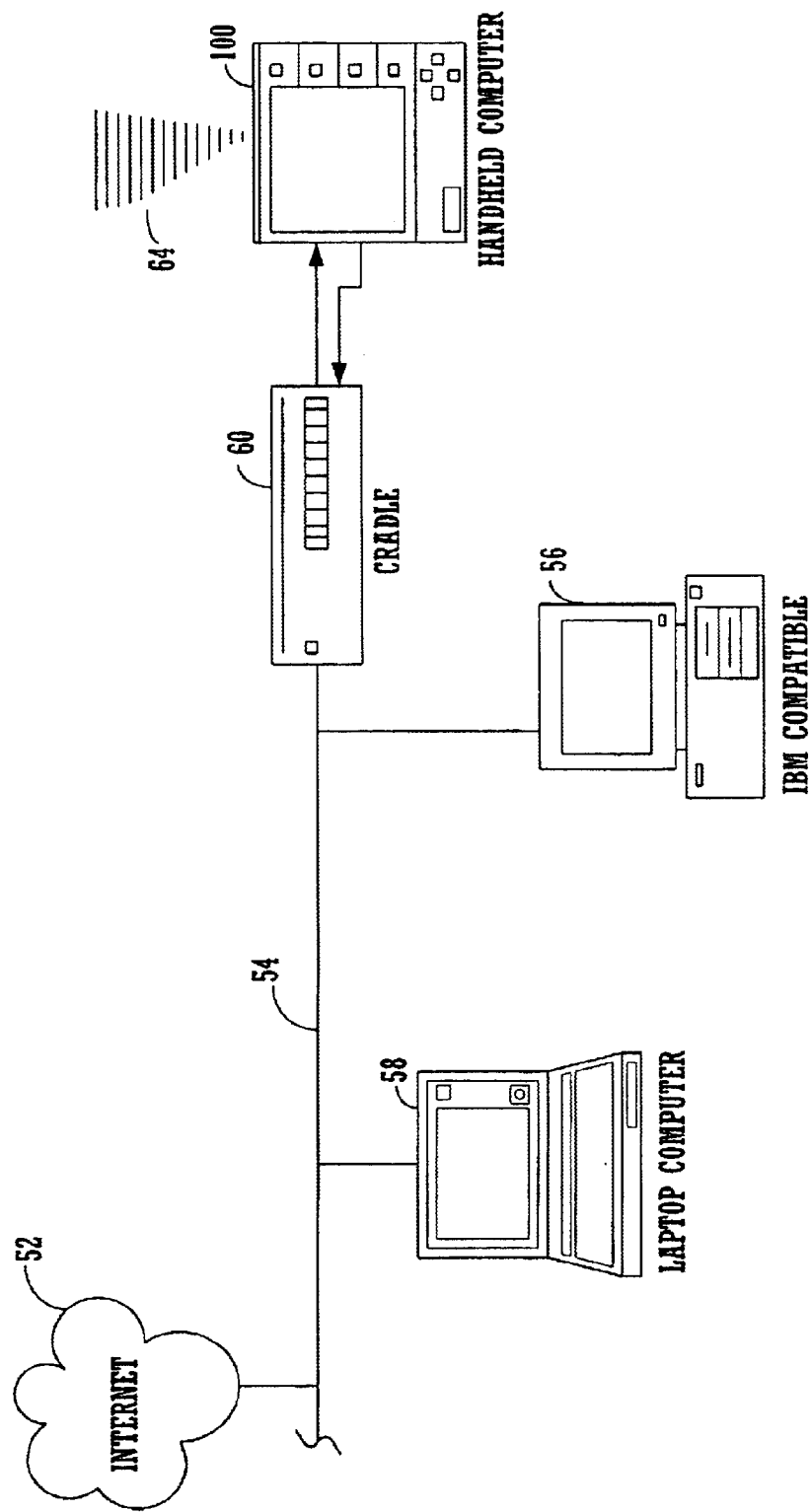
FIG. 2B is a block diagram of a portable computer system connected to other computer systems and the Internet via a cradle device, in accordance with one embodiment of the present invention.

FIG. 2B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer"). Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 2B, the existing telephone network could also be a packet-based network utilized by some conventional portable computer systems.

With reference to both FIGS. 2A and 2B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 3:
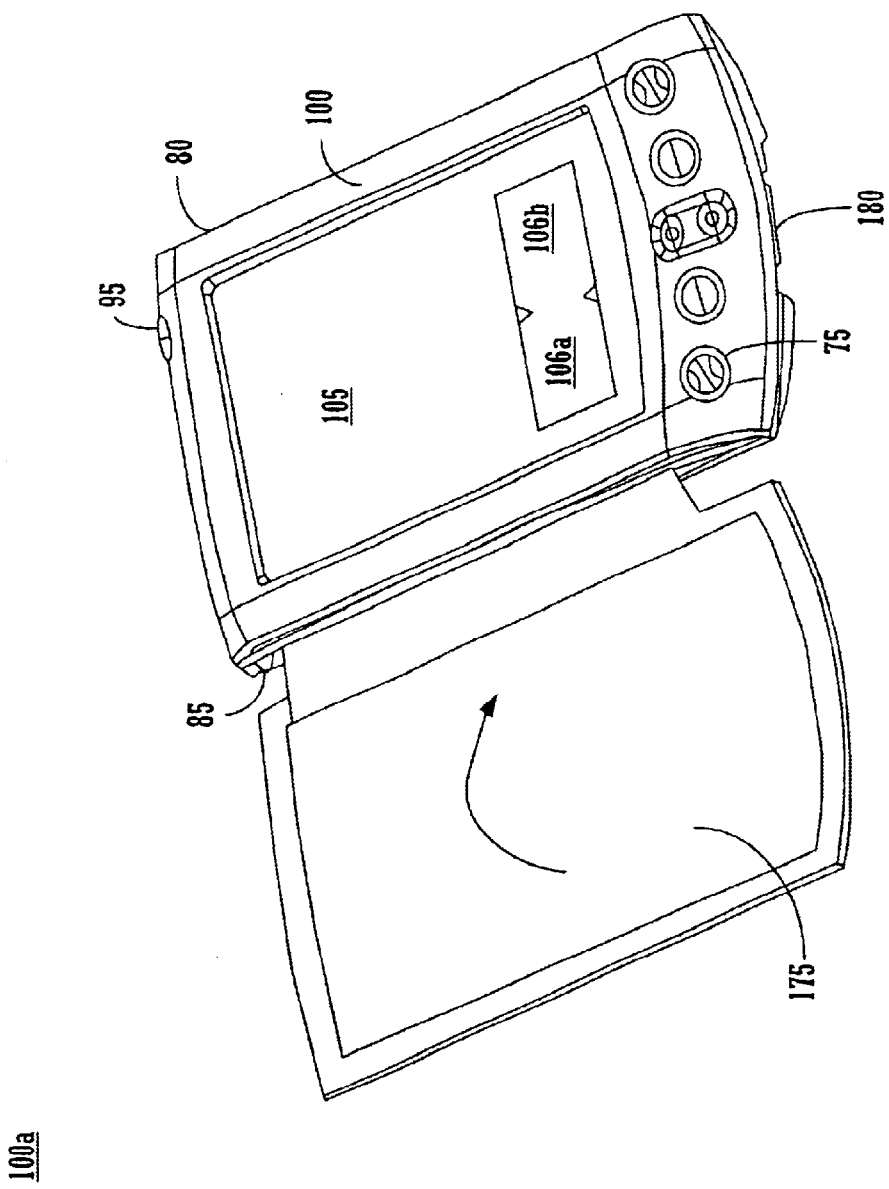
FIG. 3 is a top side perspective of a portable computer system in accordance with one embodiment of the present invention.

FIG. 3 is a perspective illustration of the top face 100a of one embodiment of a palmtop computer system 100. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. By virtue of the viewing perspective of palmtop computer 100, stylus 80 is not visible. The top face 100a also contains one or more dedicated and/or programmable buttons 75 for selecting information and causing the computer system to implement functions. Portable computer system 100 is shown as having optional data storage device receptacle 140, adapted to receive optional data storage devices, e.g., memory sticks, secure data cards, and the like. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc. The on/off button 95 is also shown.

It should be appreciated that when portable computer 100 is equipped with a front cover 175, in one embodiment of the present invention, front cover 175, adapted to provide protection against damage to display screen 105, may rotate as shown by the arrow, about the axis, or hinge, as shown in FIG. 3.

FIG. 3 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 4:
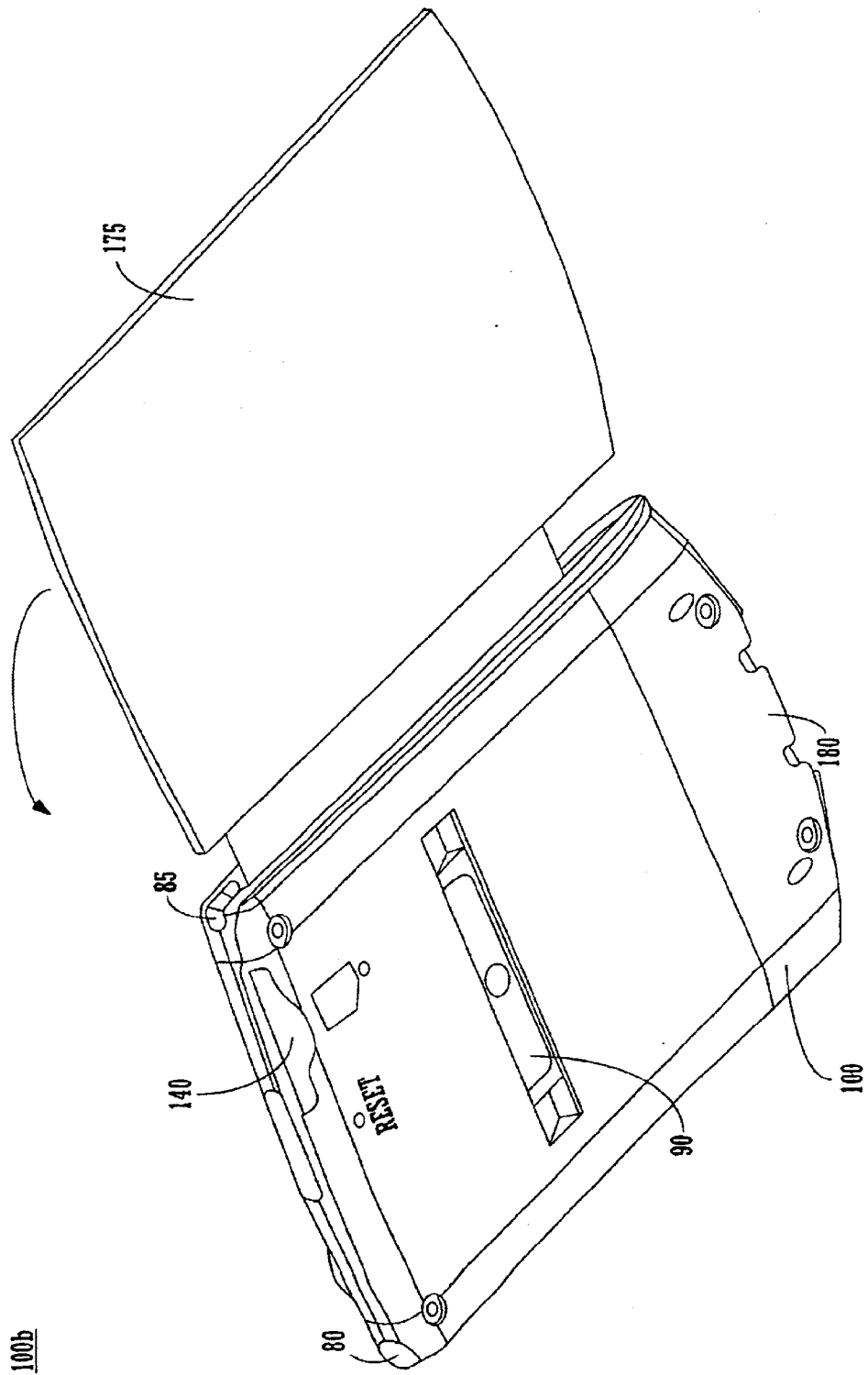
FIG. 4 is a bottom side perspective of the portable computer system of FIG. 3.

FIG. 4 illustrates the bottom side 100b of one embodiment of a palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

It should be appreciated that when portable computer 100 is equipped with a front cover 175, in one embodiment of the present invention, front cover 175, adapted to provide protection against damage to display screen 105, may rotate as shown by the arrow, about the axis, or hinge, as shown in FIG. 4.

Figure 5:
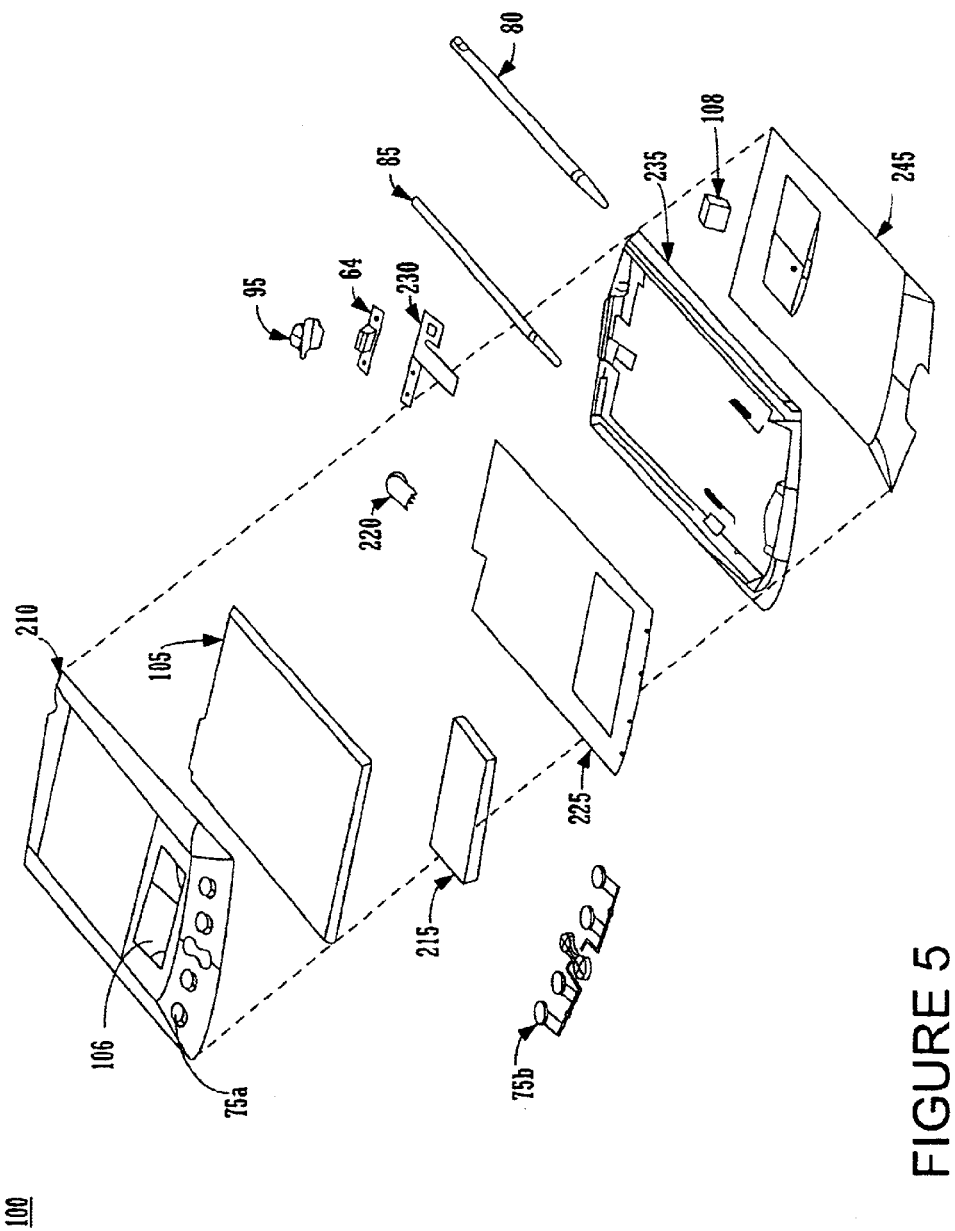
FIG. 5 is an exploded view of the components of the portable computer system of FIG. 3.

FIG. 5 is an exploded view of the palmtop computer system 100 in accordance with one implementation. It should be noted that front cover 175, as depicted in FIGS. 3 and 4, is not shown so as to simplify the description of the exploded view of portable computer 100. Computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Communication interface 180 is also shown. Position-adjustable antenna 85 is shown.

Infrared communication mechanism 64 (e.g., an infrared emitter and detector device) is for sending and receiving information from other similarly equipped devices (see FIG. 2B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 2A).

Figure 6:
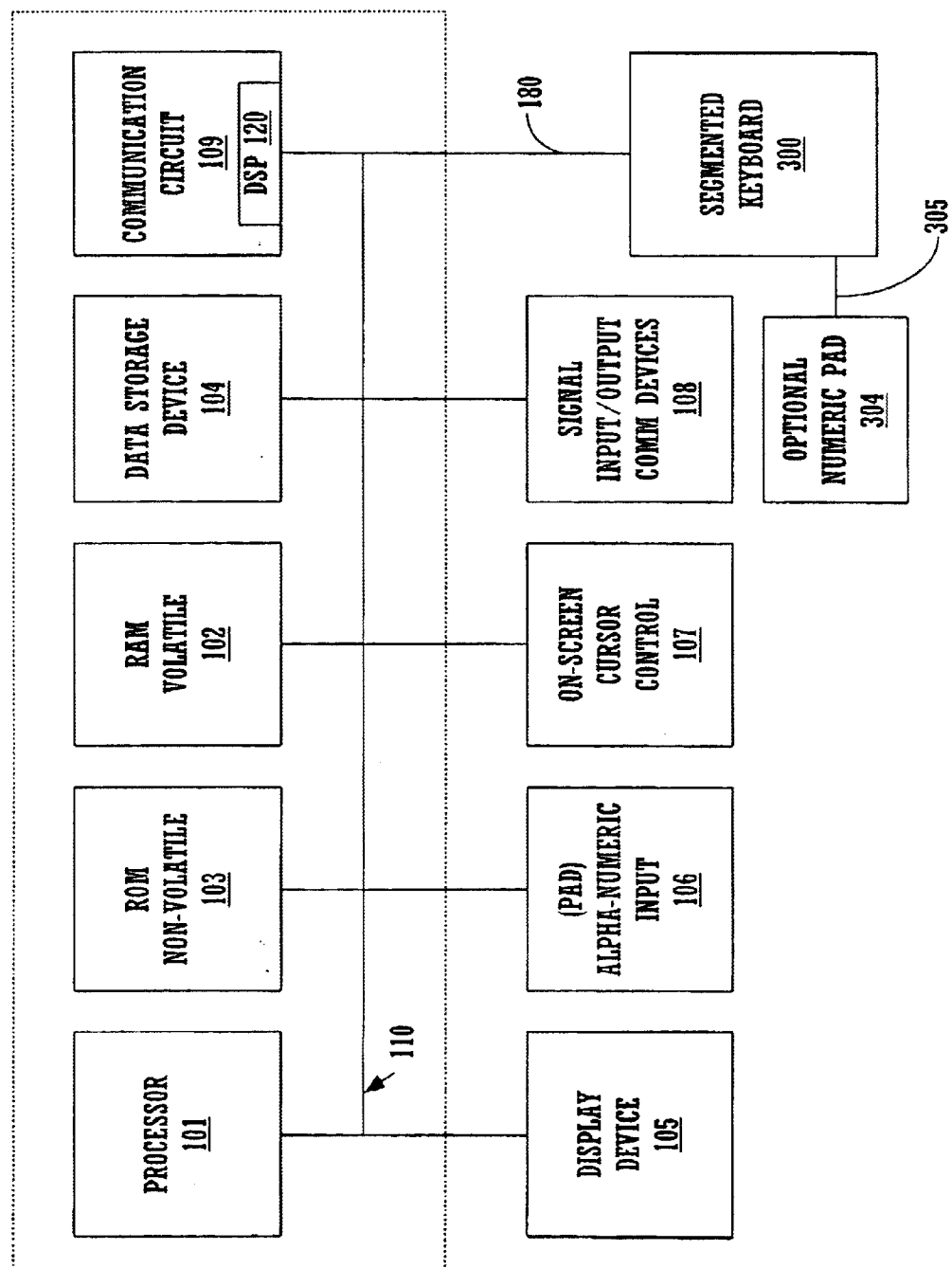
FIG. 6 is a block diagram of one embodiment of a portable computer system in accordance with one embodiment of the present invention.

FIG. 6 illustrates circuitry of computer system 100, some of which can be implemented on PC board 225 (FIG. 5). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a nonvolatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 6, computer system 100 also includes a signal transmitter/receiver device 108, which is coupled to bus 10 for providing a physical communication link between computer system 100, and a network environment (e.g., network environments 50 and 51 of FIGS. 2A and 2B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 5) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Figure 14:
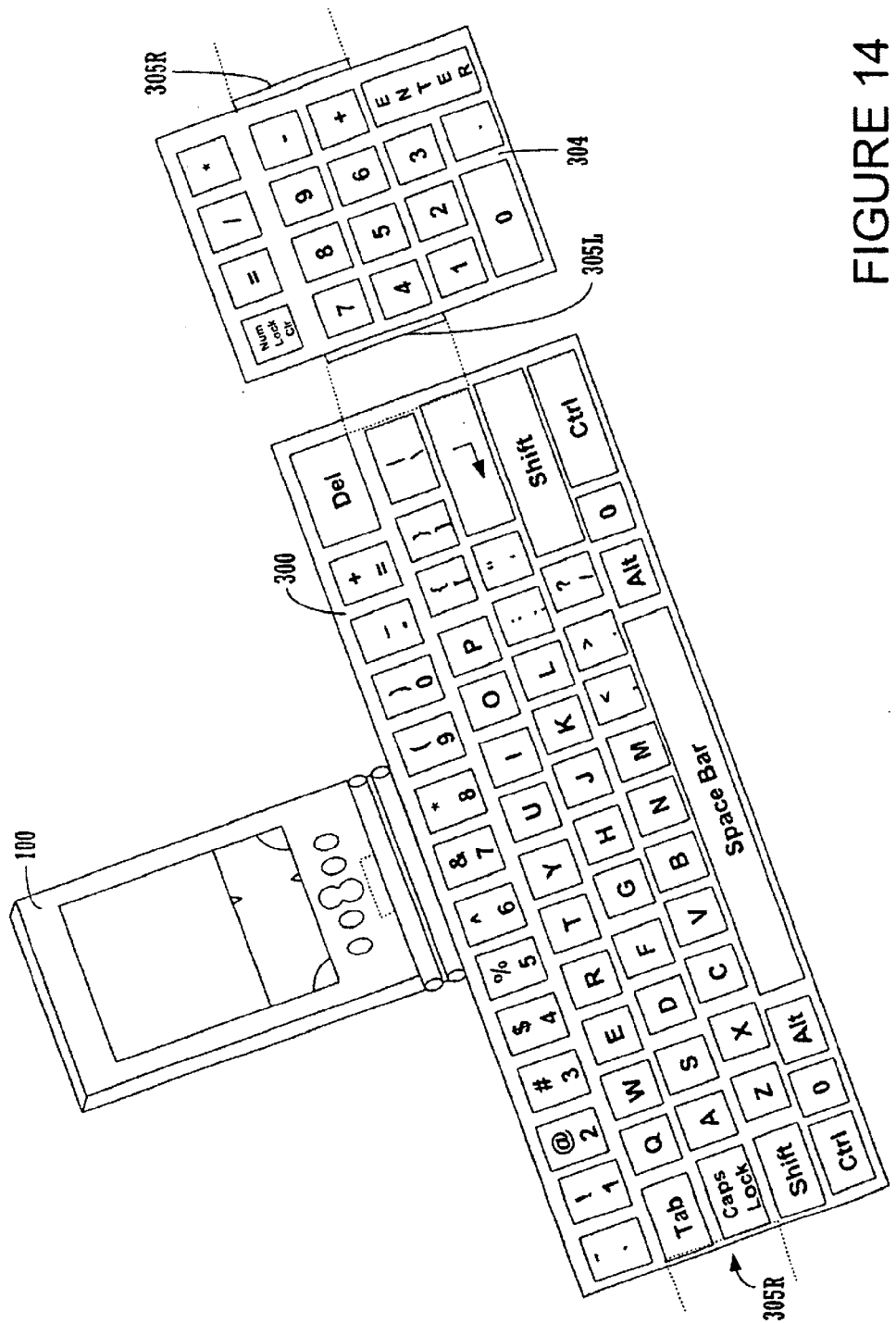
FIG. 14 is a front angled view perspective of the embodiment of the present invention of FIG. 11 shown in the operational position with an optional numeric key pad being coupled to the present invention, in accordance with one embodiment of the present invention.

In the present embodiment, the present invention 300 is communicatively coupled with palmtop computer system 100 via electrical connector 180. Electrical connector 180 is analogous to communication interface 180 as described in FIGS. 3, 4 and 5. Additionally, optional numeric input pad 304 (FIG. 14) is coupled with present invention 300 via connector 305 (FIG. 14). Numeric input pad 304 is provided for those instances when large amounts of numeric data is to be inputted.

Also included in computer system 100 of FIG. 6 is an optional alphanumeric input device 106 that in one implementation is a handwriting recognition pad ("digitizer") having regions 106a and 106b (FIG. 3), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a field emission display device (also called a flat panel CRT) or other display device suitable for generating graphic images and alphanumeric characters recognizable to the user. In the preferred embodiment, display device 105 is a flat panel display.

Segmented Keyboard of the Present Invention

Figure 7A:
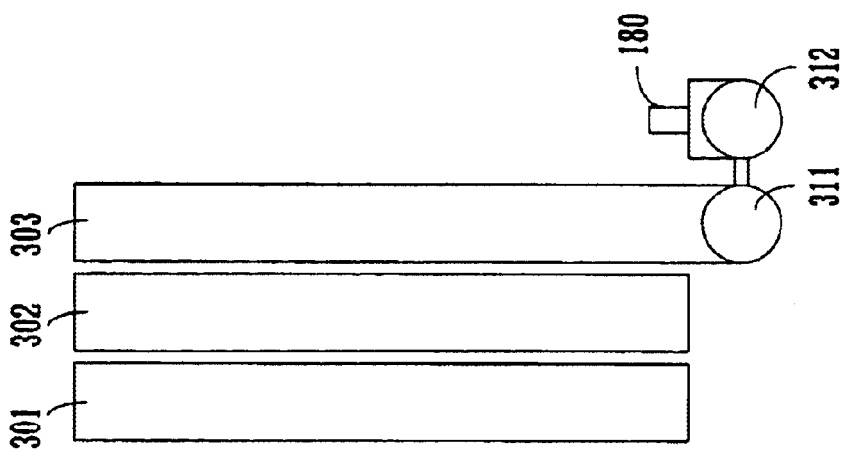
FIG. 7A is a side view perspective of the present invention, in accordance with one embodiment of the present invention.
Figure 13:
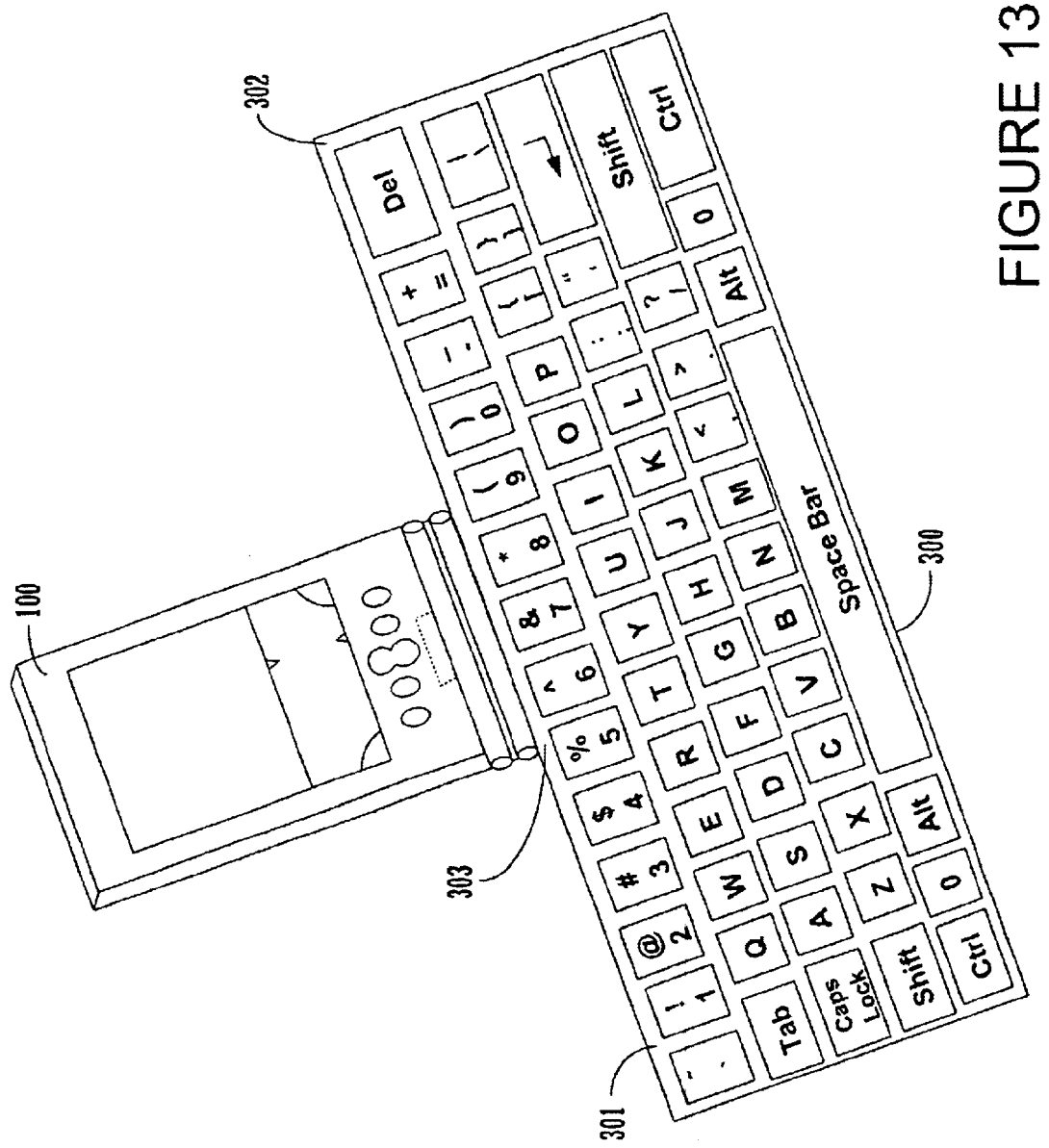
FIG. 13 is a front angled view perspective of the embodiment of the present invention of FIG. 11 shown in the open or operational position, in accordance with one embodiment of the present invention.

In FIG. 7A, on the left, segmented keyboard 300 is shown, in one embodiment of the present invention. Shown as being in the closed position are, from left to right, flippable hinged keyboard portions 301, 302, and fixed central keyboard portion 303, fixed central keyboard portion 303 being fixed relative to flippable keyboard portions 301 and 302. Flippable hinged keyboard portions 301, 302, and fixed central keyboard portion 303 contain a full compliment of input keys normally associated with a full sized keyboard. When flippable hinged keyboard portions 301 and 302 are flipped open about fixed central keyboard portion 303, segmented keyboard 300 is in the open position, as shown in FIG. 13, and a user may then utilize the now accessible input keys for inputting data into a computer system, provided a computer system is coupled with segmented keyboard 300, in one embodiment of the present invention.

Rotatable hinge 311, as shown in FIG. 7A, is integral to fixed portion 303. Rotatable hinge 311 is adapted to provide angular positioning of the segmented keyboard such that an optimum ergonomic position is obtained relative to the individual user. Being fully adjustable, rotatable hinge 311 allows for proper ergonomic positioning in almost any environment. Shown to the right of rotatable hinge 311 is rotatable hinge 312. Rotatable hinge 312 is adapted to provide angular positioning of a coupled computer system such that an optimum view angle position of the display panel/screen of the coupled computer system is obtained relative to the individual user. Being fully adjustable, rotatable hinge 312 allows for optimum viewing positioning in almost any environment.

Still with reference to FIG. 7A, the hinge that comprises rotatable hinges 311 and 312 is a clutch hinge, in one embodiment of the present invention. A clutch hinge is adapted to positively maintain the position in which it is set until re-positioned by an individual. Therefore, a back support member is not required to maintain the set position.

Figure 7B:
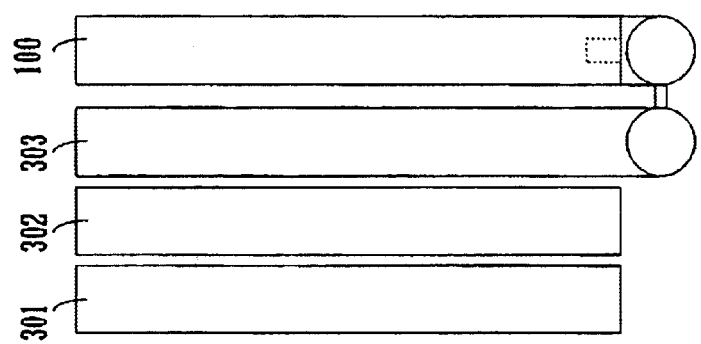
FIG. 7B is a side view perspective of the embodiment of the present invention of FIG. 7A coupled with a portable computer system, in accordance with one embodiment of the present invention.

FIG. 7B, is analogous to FIG. 7A except portable computer system 100, analogous to portable computer system 100 as previously described above, is shown as connected to segmented keyboard 300 via electrical connector 180. By connecting portable computer system 100 to electrical connector 180, communication between segmented keyboard 300 and portable computer system is established.

Figure 7C:
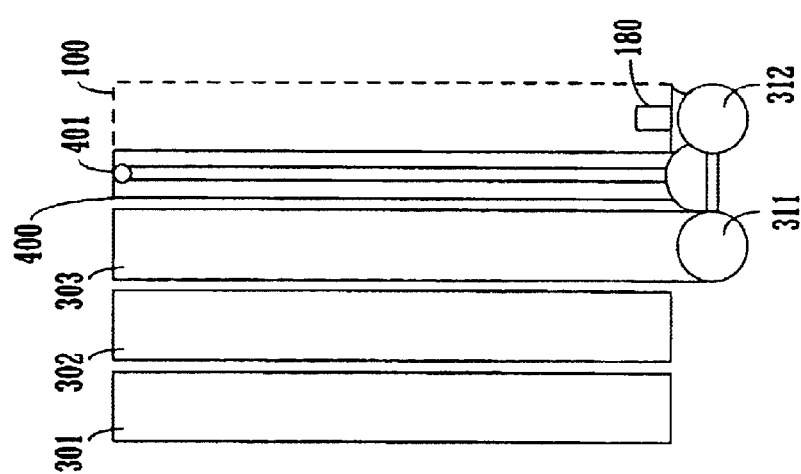
FIG. 7C is a side view perspective of the embodiment of the present invention having a back support member, in accordance with one embodiment of the present invention.

FIG. 7C illustrates another embodiment of the present invention. In this embodiment, the hinge that comprises rotatable hinges 311 and 312 is not a clutch hinge, and therefore a back support member is needed. Back support member 400 is shown as disposed integral with rotatable hinge 312 and electrical connector 180. Back support member 400 is adapted to provide a positive stop for support of a portable computer system. Rotatable hinge 401 enables back support member 400. The dotted line 100 represents the outline of portable computer system 100, had portable computer system 100 been present.

Figure 8A:
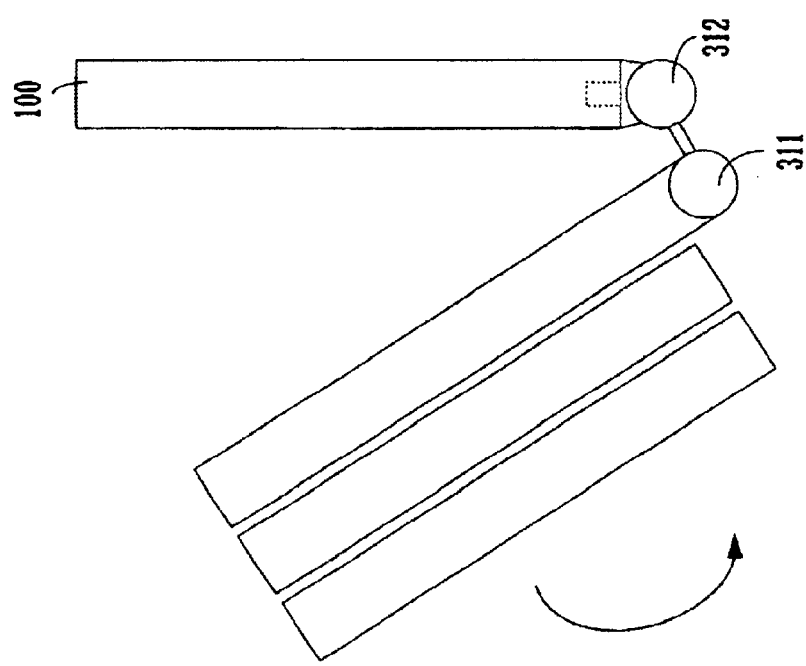
FIG. 8A is a side view perspective of the embodiment of the present invention of FIG. 7B shown as being rotated in preparation for use, in accordance with one embodiment of the present invention.

FIG. 8A shows segmented keyboard 300 of FIG. 7B being rotated about the axis of rotatable hinge 311 in preparation for use, in one embodiment of the present invention. The direction of the rotation is indicated by the arrow. Portable computer system 100, shown as communicatively coupled, via electrical connector 180, to segmented keyboard 300, is oriented such that the display panel/screen is facing to the right.

Figure 8B:
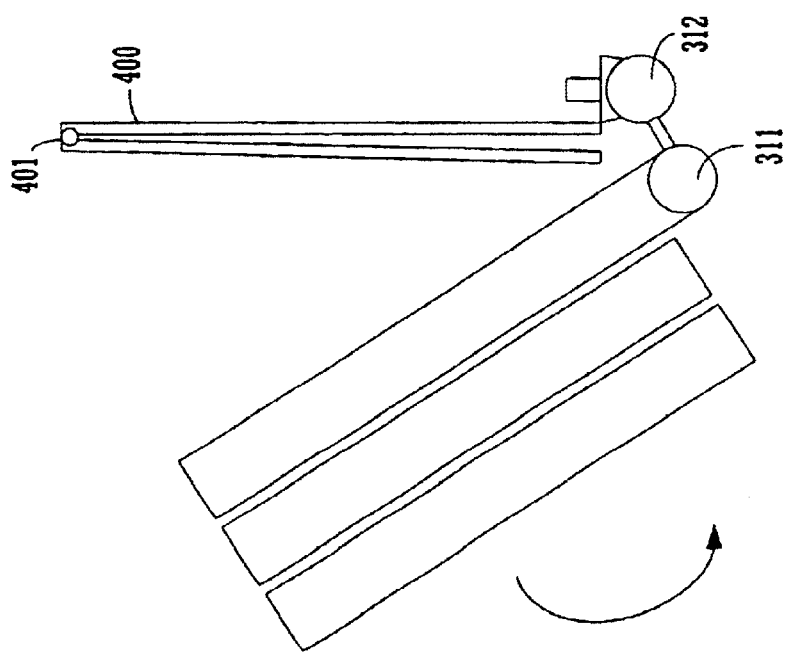
FIG. 8B is a side view perspective of the embodiment of the present invention of FIG. 7C shown as being rotated in preparation for use, in accordance with one embodiment of the present invention.

FIG. 8B shows segmented keyboard 300 in FIG. 7C being rotated about the axis of rotatable hinge 311 in preparation for use, in another embodiment of the present invention. The direction of the rotation is indicated by the arrow.

FIG. 9A shows segmented keyboard 300 of FIG. 8A sequentially further rotated about the axis of rotatable hinge 311 in preparation for use, in one embodiment of the present invention. The direction of the rotation is indicated by the arrow.

FIG. 9B shows segmented keyboard 300 of FIG. 8B sequentially further rotated about the axis of rotatable hinge 311 is preparation for use, in one embodiment of the present invention. The direction of the rotation is indicated by the arrow.

FIG. 10A shows segmented keyboard 300 of FIG. 8A in a preliminary user position. Portable computer system 100, oriented such that the display panel/screen is facing to the right, may be rotated, about the axis of rotatable hinge 312, in either direction as indicated by the arrows. This enables the user to adjust the viewing angle to obtain the optimum viewing angle relative to that particular user. It should be appreciated that the present invention enables each user, regardless of their physical characteristics, their environment, or specific needs at the time of use, to adjust the view angle of the display panel/screen to an optimum angle, relative to that user.

Still in FIG. 10A, segmented keyboard 300 is shown in the open position, having had flippable hinged keyboard portions 301 and 302 rotated about fixed central keyboard portion 303, in one embodiment of the present invention. FIG. 13 is an illustration depicting segmented keyboard 300 in an open position. Segmented keyboard 300 may be rotated, about the axis of rotatable hinge 311, in either direction as indicated by the arrows. It should be appreciated that the present invention enables each user, regardless of their physical characteristics, their environment, or specific needs at the time of use, to adjust segmented keyboard 300 to an optimum ergonomic position, relative to that user.

Additionally, because the rotatable hinges are clutch hinges, portable computer system 100 and segmented keyboard 300 will remain in the positions set by the user until the user physically re-positions either, thereby providing retained positioning of both segmented keyboard 300 and portable computer system 100.

Figure 10B:
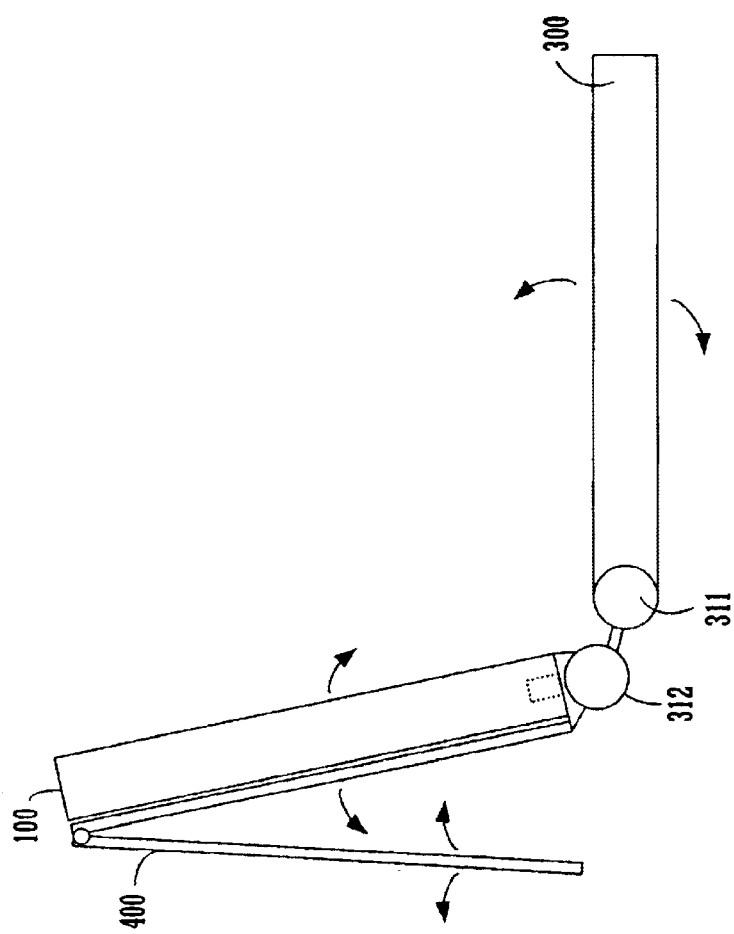
FIG. 10B is a side view perspective of the embodiment of the present invention of FIG. 9B shown in operative position coupled with a portable computer system and utilizing the back support member, in accordance with one embodiment of the present invention.

FIG. 10B shows segmented keyboard 300 of FIG. 8B in a preliminary user position. FIG. 10B is analogous to FIG. 10A with the exception of the rotatable hinges. In this embodiment of the present invention, the rotatable hinges are not clutch hinges and therefore back support member 400 is needed and thusly shown. Support member 400 may be rotated in the directions as indicated by the arrows. The positioning of the back support member 400 is reflected in the viewing angle of the display panel/screen of the portable computer system. Portable computer system 100, oriented such that the display panevscreen is facing to the right, may be rotated, about the axis of rotatable hinge 312, in either direction as indicated by the arrows. As previously stated, this enables the user to adjust the viewing angle to obtain the optimum viewing angle relative to that particular user. It should be appreciated that the present invention enables each user, regardless of their physical characteristics, their environment, or specific needs at the time of use, to adjust the view angle of the display panel/screen to an optimum angle, relative to that user.

Still in FIG. 10B, segmented keyboard 300 is shown in the open position, having had flippable hinged keyboard portions 301 and 302 rotated about fixed central keyboard portion 303, in this embodiment of the present invention. FIG. 13 is an illustration depicting segmented keyboard 300 in an open position. Segmented keyboard 300 may be rotated, about the axis of rotatable hinge 311, in either direction as indicated by the arrows. It should be appreciated that the present invention enables each user, regardless of their physical characteristics, their environment, or specific needs at the time of use, to adjust segmented keyboard 300 to an optimum ergonomic position, relative to that user.

Additionally, because, in this embodiment of the present invention, the rotatable hinges are not clutch hinges, back support member 400 is present for retained positioning of the view angle of the display panel of portable computer system 100 as required by the user.

Figure 11:
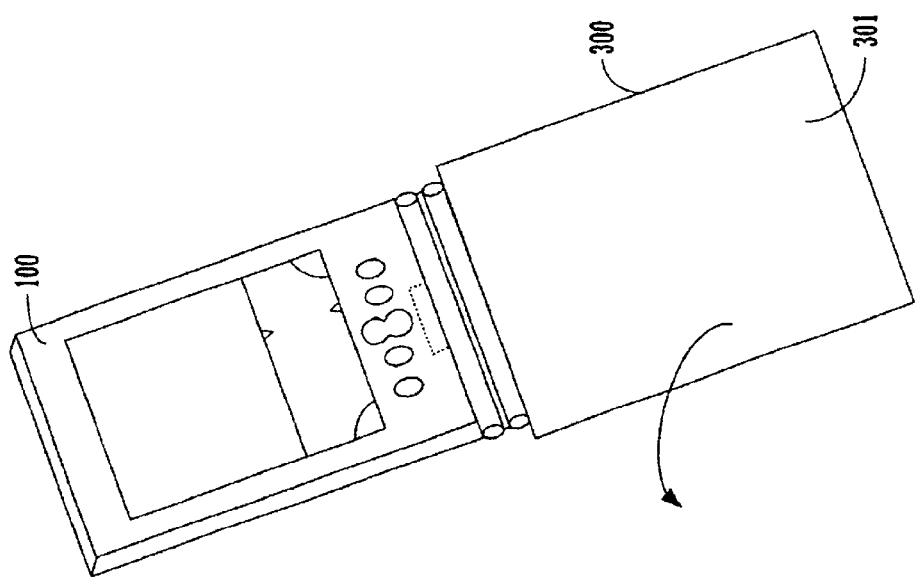
FIG. 11 is a front angled view perspective of the embodiment of the present invention, shown in the closed position, coupled with a portable computer system, in accordance with one embodiment of the present invention.

FIG. 11 is a front angled illustration of the present invention, segmented keyboard 300, coupled to portable computer system 100, in one embodiment of the present invention. Segmented keyboard 300 is shown in the closed position and the back surface of flippable keyboard portion 301 is therefore visible. Flippable hinged portion 301 is adapted to be rotated about fixed central keyboard portion 303 as indicated by the arrow.

Figure 12:
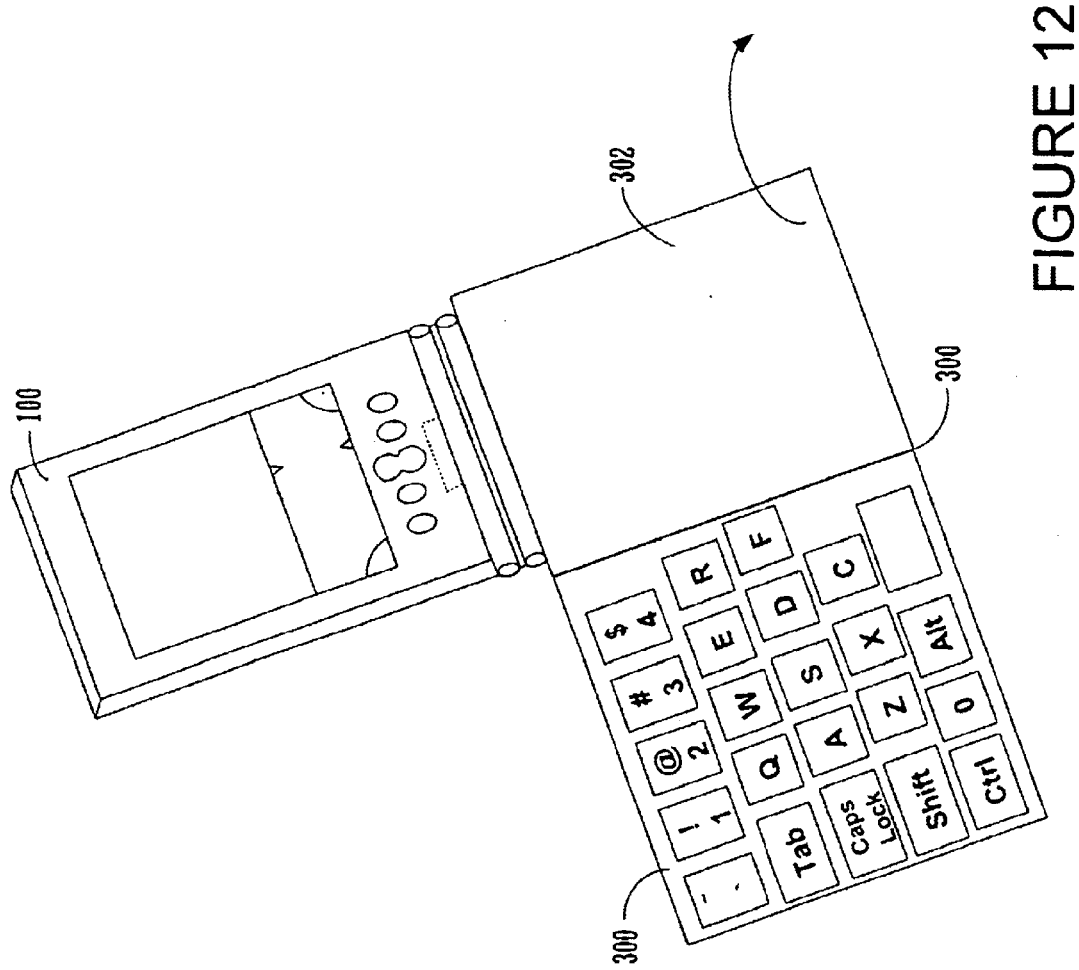
FIG. 12 is a front angled view perspective of the embodiment of the present invention of FIG. 11 shown as partially open, in accordance with one embodiment of the present invention.

FIG. 12 is a front angled illustration of the sequential continuation of the opening of segmented keyboard 300 of FIG. 11, in one embodiment of the present invention. Flippable hinged keyboard portion 301 is shown as having been rotated about fixed central keyboard portion 303 (FIG. 7A) and is open, thereby displaying those input keys disposed therein. Flippable hinged keyboard portion 302 is still in the closed position, and only it's back surface is therefore visible. Flippable hinged keyboard portion 302 is adapted to be rotated about fixed central keyboard portion 303 as indicated by the arrow.

FIG. 13 is a front angled illustration of the sequential continuation of the opening of segmented keyboard 300 of FIG. 12, in one embodiment of the present invention. Flippable hinged keyboard portion 301 has been rotated about fixed central keyboard portion 303 and is in the open position. Additionally, flippable hinged keyboard portion 302 has also been rotated about fixed central portion 303 and is in the open position. By virtue of both flippable hinged keyboard portions, 301 and 302, respectively, having been rotated about fixed central keyboard portion 303, segmented keyboard 300 is in the open position, and the full compliment of input keys is therefore visible. By providing a full compliment of input keys, a user may quickly and easily write email, write letters, take notes during meetings, edit documents, almost any task associated with the utilization of a full-sized keyboard.

It should be appreciated that although portable computer system 100 is depicted as being in a portrait (vertical) orientation in the context of the disclosure, in another embodiment of the present invention, portable computer system 100 may be placed in a landscape (horizontal) orientation.

FIG. 14 is a front angle illustration of segmented keyboard 300 with an optional numeric input pad 304, in one embodiment of the present invention. Optional numeric input pad 304 is shown as being coupled to segmented keyboard 300 via connector 305L: Connector 305L, in this embodiment of the present invention, provides the communication link between numeric input pad 304 and keyboard 300. Numeric input pad 304 is provided for those instances when large amounts of numeric data must be inputted, for example, when entering numbers for year end reports, balance sheets, mathematical formulas, and the like. By keeping numeric input pad 304 analogous to a numeric pad normally found on a full sized keyboard, those users with ten key touch experience with be able to enter the data as quickly as if they using a full-sized keyboard.

It should be appreciated that in another embodiment of the present invention, optional numeric input pad may be coupled with segmented keyboard 300 via electrical connector 305R. Electrical connector 305R is provided for those users who are left hand oriented when entering numeric data.

Figure 15:
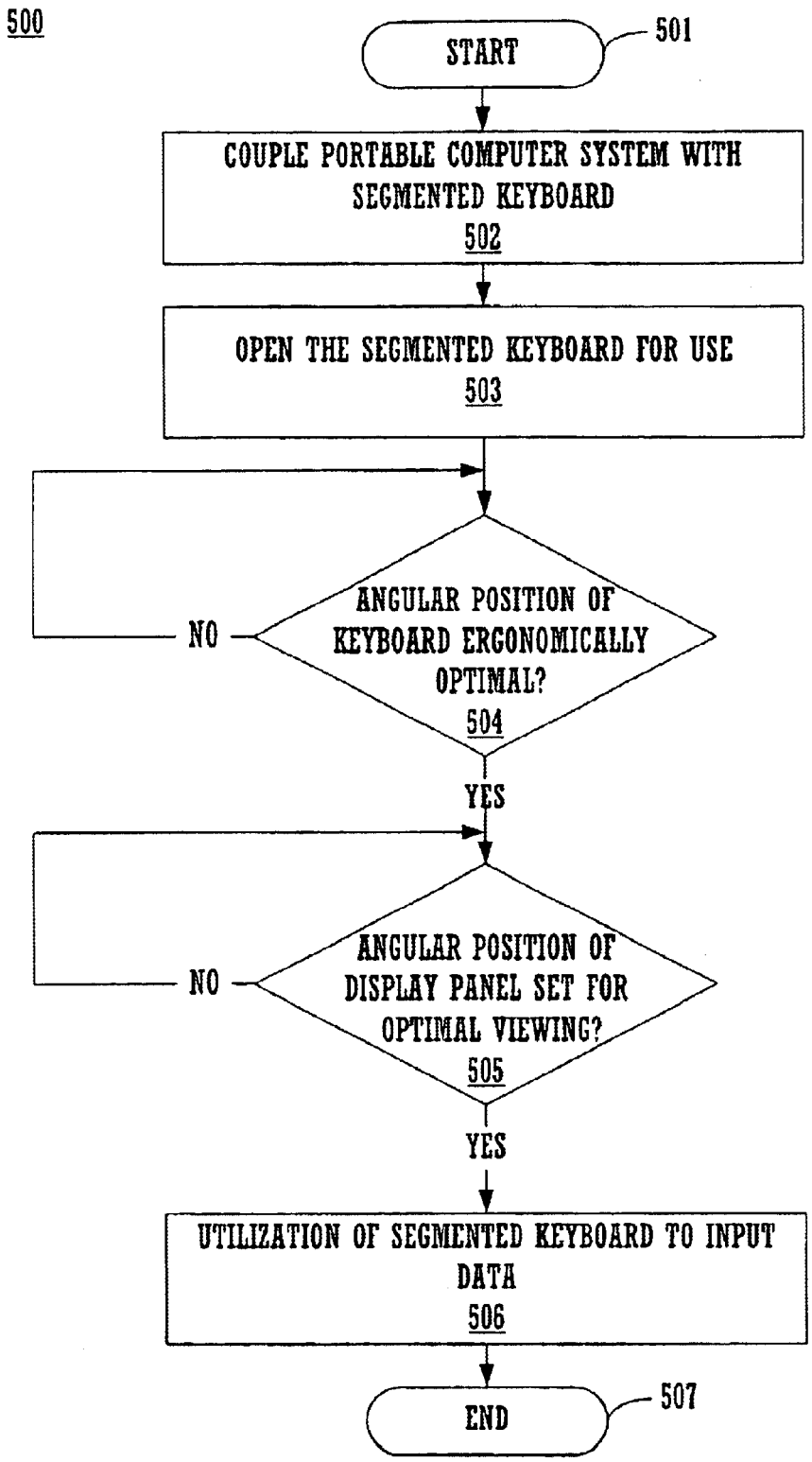
FIG. 15 is a flowchart showing the steps in a process 500 for utilization of the segmented keyboard for obtaining optimal ergonomic and view angle positioning of the segmented keyboard when coupled with a portable computer system.

FIG. 15 is a flowchart showing the steps in a process 500 for utilization of the segmented keyboard for obtaining optimal ergonomic and view angle positioning of the segmented keyboard when coupled with a portable computer system.

In Step 502, portable computer system 100 is coupled, via electrical connector 180, to segmented keyboard, as shown in FIGS. 7B, 8A, 9A, 10A, 10B, 11, 12, and 13, in one embodiment of the present invention.

In Step 503, the segmented keyboard is opened in accordance with the descriptions in FIGS. 11, 12, and 13, respectively, in one embodiment of the present invention.

It should be appreciated that the step of opening segmented keyboard may be performed in Step 502, and the step of coupling portable computer system 100 to segmented keyboard may be performed in Step 503, in one embodiment of the present invention. It is the sole discretion of the user to determine the order of Steps 502 and 503.

Once segmented keyboard 300 is in the open and operational position and portable computer system 100 has been coupled with segmented keyboard 300 via electrical connector 180 (FIG. 13), the user should then adjust the angular positioning of both components.

In Step 504, segmented keyboard 300 is angularly positioned. It is through the utilization of rotatable hinge 311 (FIGS. 10A and 10B) that the optimum ergonomic position, relative to that particular user, is obtained. It should be appreciated that, in most circumstances, each user will have a different optimum ergonomic position, and that rotatable hinge 311 provides that functionality to the present invention, and ultimately to the user.

In Step 505, portable computer system 100 is angularly positioned, in one embodiment of the present invention. It is through the utilization of rotatable hinge 312 (FIGS. 10A and 10B) that the optimum viewing angle position of the display panevscreen, relative to that particular user, is obtained. It should be appreciated that, in most circumstances, each user will have a different optimum view angle position, and that rotatable hinge 312 provides that functionality to the present invention, and ultimately to the user.

It should be appreciated that the order of Steps 504 and 505 may be switched, in one embodiment of the present invention. It is the user's choice of whether to adjust the segmented keyboard or the portable computer system first. The present invention provides the functionality to do both, and it matters not which is performed first.

Provided the segmented keyboard and the portable computer system are in their respective optimum angular positions, the user may then utilize the present invention for the purpose for which it is intended, to easily and quickly input data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A segmented keyboard adapted to provide user inputting of data, said segmented keyboard comprising:
   a compliment of input keys comprising a segmented keyboard;
   a central keyboard section;
   a first flippable keyboard portion hinged to said central keyboard section and having an open and a closed position;
   a second flippable portion hinged to said central keyboard section and having an open and a closed position;
   an attachable numeric input pad, adapted to be optionally coupled with a flippable hinged portion of said segmented keyboard;
   a first rotatable hinge coupled with said central keyboard section;
   a second rotatable hinge coupled with said first rotatable hinge; and
   an electrical connector coupled to said second rotatable hinge, wherein said electrical connector detachably couples said second rotatable hinge of segmented keyboard to a portable electronic device.

2. The segmented keyboard of claim 1 wherein said electrical connector is adapted to couple said segmented keyboard with a portable computer system.

3. The segmented keyboard of claim 1 wherein when said first flippable portion and said second flippable portion are in said open position a compliment of input keys are accessible to a user for said inputting of data.

4. The segmented keyboard of claim 1 wherein when said first flippable portion and said second portion are in said closed position, said segmented keyboard is of a size and shape approximate to the size and shape of said portable electronic device a portable computer system.

5. The segmented keyboard of claim 1 wherein said first rotatable hinge is adapted to provide angular positioning of said segmented keyboard.

6. The segmented keyboard of claim 5 wherein said angular positioning of said segmented keyboard provided by said first rotatable hinge enables optimum ergonomic positioning of said segmented keyboard relative to an individual user.

7. The segmented keyboard of claim 1 wherein said second rotatable hinge adapted to provide angular positioning of a portable computer system, when said portable computer system is coupled to said segmented keyboard.

8. The segmented keyboard of claim 7 wherein said angular positioning of said portable computer system provided by said second rotatable hinge enables optimum view angle positioning of the display panel of said portable computer system relative to an individual user.

9. The segmented keyboard of claim 1 wherein the hinges of said first rotatable hinge and said second rotatable hinge are clutch hinges, said clutch hinges are adapted to maintain an optimum ergonomic positioning of said segmented keyboard and to maintain an optimum view angle positioning of a display panel of a portable computer system with regard to an individual user.

10. A computer system having a portable computer and a segmented keyboard, said segmented keyboard detachably coupled with said portable computer, said segmented keyboard for providing user inputted data for said portable computer, said segmented keyboard comprising:
    a compliment of input keys comprising a segmented keyboard;
    a central keyboard portion;
    a first flippable portion hinged to said central keyboard portion and having an open and closed position;
    a second flippable portion hinged to said central keyboard portion and having an open and closed position;
    an attachable numeric Input pad, adapted to be optionally coupled with a flippable hinged portion of said segmented keyboard;
    a first rotatable hinge coupled with said segmented keyboard;
    a second rotatable hinge coupled with said first rotatable hinge; and
    an electrical connector coupled to said second rotatable hinge wherein said electrical connector detachably couples said second rotatable hinge of said segmented keyboard to a portable electronic device.

11. The computer system of claim 10 wherein said electrical connector is adapted to detachably couple said segmented keyboard with said portable computer.

12. The computer system of claim 10 wherein said compliment of input keys are accessible to a user for said inputting of data provided said first flippable hinged portion and said second flippable hinged portion of said segmented keyboard are in said open position.

13. The computer system of claim 10 wherein said segmented keyboard is of a size and shape approximate to the size and shape of said portable computer when said first flippable hinged portion and said second flippable hinged portion of said segmented keyboard are in said closed position.

14. The computer system of claim 10 wherein said first rotatable hinge is adapted to provide angular positioning of said segmented keyboard.

15. The computer system of claim 14 wherein said angular positioning of said segmented keyboard provided by said first rotatable hinge enables optimum ergonomic positioning of said segmented keyboard relative to an individual user.

16. The computer system of claim 10 wherein said second rotatable hinge is adapted to provide angular positioning of said portable computer, provided said portable computer is coupled with said segmented keyboard.

17. The computer system of claim 16 wherein said angular positioning of said portable computer provided by said first rotatable hinge enables optimum view angle positioning of the display panel of said portable computer relative to an individual user.

18. The computer system of claim 10 wherein said hinges of said first rotatable hinge and said second rotatable hinge are clutch hinges, said clutch hinges for maintaining an optimum ergonomic position of said segmented keyboard and maintaining an optimum view angle positioning of a display panel of a portable computer relative to an individual user.

19. In a portable computer system detachably coupled with a segmented keyboard, said segmented keyboard having a first rotatable hinge and a second rotatable hinge coupled with said first rotatable hinge an electrical connector coupled to said second rotatable hinge, wherein said electrical connector detachably couples said second rotatable hinge of said segmented keyboard to a portable electronic device, a method of optimizing the positioning of said segmented keyboard and said portable computer system relative to an individual user, said method comprising the steps of:

positioning said segmented keyboard via said first rotatable hinge such that an optimum ergonomic position is obtained relative to an individual user; and positioning said portable computer system via said second rotatable hinge such that an optimum view angle position is obtained relative to an individual user.

20. The method as recited in claim 19 wherein said hinges of said first rotatable hinge and said second rotatable hinge are clutch hinges, such that said clutch hinges maintain said optimum ergonomic position of said segmented keyboard and said optimum view angle positioning of said portable computer system relative said individual user.

* * * * *